(No Model.)

M. E. BOUGHTON.
GATE.

No. 443,484. Patented Dec. 23, 1890.

Witnesses:
E. P. Ellis,
B. Brockett

Inventor
M. E. Boughton,
per Lehmann & Pattison,
atty.

UNITED STATES PATENT OFFICE.

MORTYMER E. BOUGHTON, OF WAUSEON, OHIO.

GATE.

SPECIFICATION forming part of Letters Patent No. 443,484, dated December 23, 1890.

Application filed October 17, 1890. Serial No. 368,377. (No model.)

*To all whom it may concern:*

Be it known that I, MORTYMER E. BOUGHTON, of Wauseon, in the county of Fulton and State of Ohio, have invented certain new and useful Improvements in Gates; and I do hereby declare the following to be a full, clear, and exact description of the invention, such as will enable others skilled in the art to which it pertains to make and use it, reference being had to the accompanying drawings, which form part of this specification.

My invention relates to an improvement in combined sliding and swinging gates; and it consists in the construction and arrangement of parts which will be fully described hereinafter.

The object of my invention is to provide a gate which is constructed to slide upon a roller journaled in a pivoted frame and to support the forward end of the gate when it is moved open by means of a wire which is connected to the pivoted frame and a latch which is connected to the forward end of the gate, so that the gate will swing around clear of the ground without any lifting on the part of the operator after the catch is made to hook over the wire.

Figure 1:
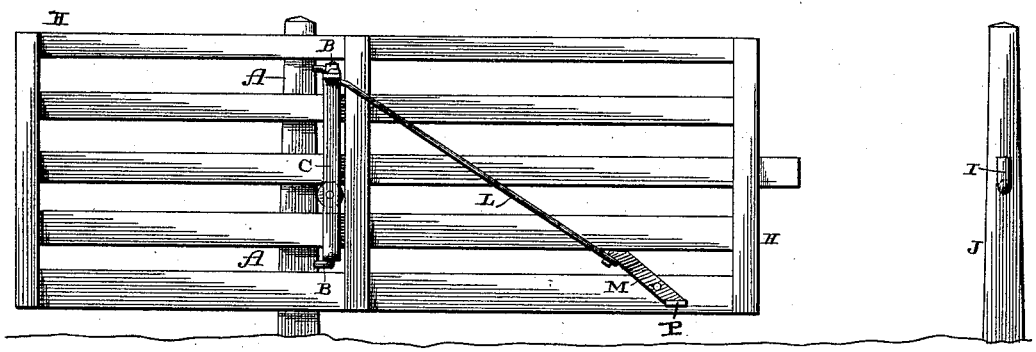
Figure 2:
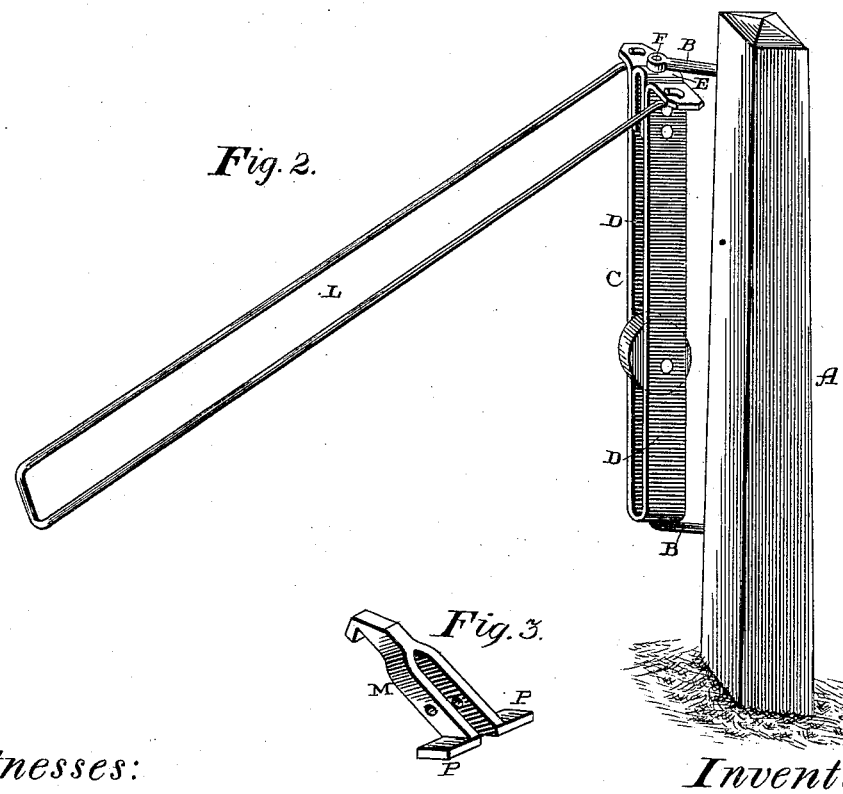
Figure 3:
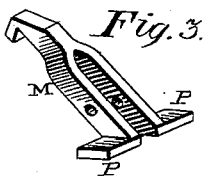

Figure 1 is a side elevation of a gate which embodies my invention, it being shown pushed back and its forward end supported by means of a catch. Fig. 2 is a perspective with the gate removed. Fig. 3 is a detached perspective of the gate.

A represents a supporting-post, from one corner of which extend two supporting-arms B, to which a frame C is pivotally connected at its upper and lower ends.

The frame C consists of a U-shaped bar D, which has its upper ends bent outward and perforated as shown. The upper ends of this bar D are connected by means of a U-shaped plate E, which has a pivotal projection F, that extends into a perforation made in the upper supporting-arm B. The lower supporting-arm B has its outer end turned upward and passed into a perforation made in the doubled end of the U-shaped bar D. By means of this construction the frame C is pivotally supported between the two arms B. Journaled within the frame C is a roller G, upon which one of the panels of the gate H slides, and which supports the rear end of the gate. The forward end of the gate has one of its rails extended outward, and this extended rail is placed in a hook I upon the post J when the gate is closed.

A U-shaped frame or wire L has its ends passed through perforations made in the outwardly-bent portions of the upper ends of the U-shaped bar D and its doubled lower end passes between the panels of the gate, as shown. Pivoted, preferably, to the lower panel of the gate is a catch M, the upper hooked end of which catches over the double portion of the wire L when the gate is moved backward into the position shown in Fig. 1. This wire and catch M support the forward end of the gate, so that it can be swung around free of the surface of the ground without any lifting on the part of the operator, except sufficient to make the catch engage the wire. Owing to the hooked end of the catch M, the gate cannot be thrown forward until the catch is disengaged from the wire. The catch has its lower end bifurcated and extending upon each side of the gate and its ends turned outward, so as to form ears P. By slightly lifting the forward end of the gate and placing the foot upon one of these extended ears P and pressing slightly downward, the catch is unhooked from the wire and the gate can then be moved forward and closed.

Having thus described my invention, I claim—

1. In a combined sliding and swinging gate, the combination of a pivoted frame through which the gate slides, a U-shaped wire connected at its upper ends to the upper portion of the pivoted frame, and a catch upon the gate which engages the doubled end of the wire, substantially as described.

2. In a combined sliding and swinging gate, the combination of a pivoted frame having projecting ears at its upper end, a U-shaped wire having its upper ends secured to the projections and its lower doubled portion passing between the bars or rails of the gate, and the catch secured to the front end of the gate for engaging the doubled portion of the wire, substantially as set forth.

3. The combination of the gate, the frame through which it slides, a supporting-wire connected at its upper end to the upper end of the frame and at its lower end formed into a loop, and a catch pivoted between its ends upon the lower front end of the gate, having its upper end formed into a hook and its lower end bifurcated and turned outward to form operating-ears, substantially as specified.

In testimony whereof I affix my signature in presence of two witnesses.

MORTYMER E. BOUGHTON.

Witnesses:
 THOS. F. HAM,
 H. H. HAM.